(12) United States Patent
Rubin et al.

(10) Patent No.: US 7,587,856 B2
(45) Date of Patent: Sep. 15, 2009

(54) COMPRESSED GROWING MEDIUM

(75) Inventors: Patti Donner Rubin, 19500 Turnberry Way, Aventura, FL (US) 33180; Jay Gee, Las Vegas, NV (US)

(73) Assignee: Patti Donner Rubin, Aventura, FL (US)

( * ) Notice: Subject to any disclaimer, the term of this patent is extended or adjusted under 35 U.S.C. 154(b) by 254 days.

(21) Appl. No.: 11/510,043

(22) Filed: Aug. 25, 2006

(65) Prior Publication Data

US 2007/0062113 A1    Mar. 22, 2007

Related U.S. Application Data

(63) Continuation-in-part of application No. 10/993,599, filed on Nov. 19, 2004, now abandoned.

(51) Int. Cl.
*A01G 9/10*    (2006.01)

(52) U.S. Cl. .................... 47/1.01 R; 47/59 S (58) Field of Classification Search ............. 47/1.01 R, 47/58.1 R, 59 R, 59 S
See application file for complete search history.

(56) References Cited

U.S. PATENT DOCUMENTS

| | | | | | |
|---|---|---|---|---|---|
| 3,524,279 | A | * | 8/1970 | Adams | 47/87 |
| 3,656,930 | A | * | 4/1972 | Martin | 71/24 |
| 3,973,355 | A | * | 8/1976 | McKenzie | 47/59 R |
| 5,458,662 | A | * | 10/1995 | Toyone | 47/62 R |
| 6,189,260 | B1 | | 2/2001 | Kusey et al. | |
| 6,408,568 | B1 | | 6/2002 | Kusey et al. | |
| 6,711,850 | B2 | | 3/2004 | Yelanich et al. | |

* cited by examiner

*Primary Examiner*—Francis T Palo
(74) *Attorney, Agent, or Firm*—Bryan G. Pratt; Rader, Fishman & Grauer PLLC (57) ABSTRACT

A growing medium includes a bulking agent compressed at a volume-to-volume ratio ranging from about 7:1 to about 10:1, being substantially free of a water-soluble binder material. The compressed bulking agent is then reground while substantially maintaining the volume-to-volume ratio.

22 Claims, 11 Drawing Sheets

COMPRESSED GROWING MEDIUM

RELATED APPLICATIONS

This is a continuation-in-part of U.S. patent application Ser. No. 10/993,599, filed on Nov. 19, 2004 now abandoned and titled "COMPRESSED GROWING MEDIUM".

BACKGROUND

Pre-seeded soil mixtures, such as germinating mixes, potting soils, peat cubes and compressed pellets, have been used in forestry, agricultural, commercial and home uses. These mixtures contain seeds dispersed in a soil mixture that is later deposited to allow the seeds to germinate and grow. These mixtures thus obviate time-consuming labor, such as digging, tilling and cultivating. Some mixtures are also used in indoor and outdoor pots and planters. Most soil mixtures are usually free from insects, diseases and weeds and have enough fertilizer incorporated for the first few weeks of plant growth. However, because of the favorable environment provided by the soil mixtures the seeds tend to germinate during storage or transport of the soil mixture before the mixture is deposited for its intended use. The seedlings are bulky and often become root-bound, resulting in limited time periods for storage transportation. They are also exposed to injury and to unfavorable environmental conditions, resulting in excessively high mortality rates of the seedlings.

In order to prevent easy germination and seed mortality, soil mixtures have been compressed into soil wafers or pellets to provide easy modes of transporting the soil mixtures while limiting the water necessary for germination. However, these compressed wafers and do not effectively prevent water intrusion or germination of the seeds.

SUMMARY

A growing medium includes a bulking agent and a water-retentive polymer blended together and compressed at a volume-to-volume ratio ranging from about 7:1 to about 10:1, being free of a water-soluble binder material.

According to another exemplary embodiment, a growing medium includes a bulking agent compressed at a volume-to-volume ratio ranging from about 3:1 to about 10:1, wherein the growing medium is ground to multiple smaller growing medium components, each smaller growing medium component maintaining the volume-to-volume ratio ranging from about 2:1 to about 10:1.

According to one alternative exemplary embodiment, the reground growing medium may be reground to have a number of differing sizes, wherein the largest mean diameter of the various reground particles is less than 0.4 inches.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary system and method for implementing a compressed growing medium with reduced seed germination is disclosed herein. More specifically, a compressed growing medium is disclosed that contains a water-retentive polymer, but contains no water soluble binder material, such as polyvinyl alcohol (PVA). Numerous specific details are set forth for purposes of explanation and to provide a thorough understanding of the present system and method for implementing a compressed growing medium. It will be apparent, however, to one skilled in the art, that the present products and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

According to one exemplary embodiment, the growing medium comprises a water retentive polymer in combination with bulking material and other components as described below.

A hydrophilic fibrous bulking agent forms the majority of the growing medium. Generally, the bulking agent ranges from about 50% to about 98% of the growing medium. Examples of the bulking agent include coir, peat, cotton, mineral wool, paper pulp, peat bark, birch bark, wool and/or hair. In one embodiment the bulking agent comprises coir, including coir fibers and/or coir dust. The bulking agent used in the growing medium is also dehydrated, having a moisture of content of about 15% or less, and more preferably of about 11% or less. While some moisture assists in maintaining the structural integrity of the growing medium during transport and handling and serves to control the relative qualities of the water-retentive polymer, using a dehydrated bulking agent helps maintain the potency of all growing medium components, including fertilizers and seeds. Using a dehydrated bulking agent in a pre-seeded growing medium also enhances the ability of the seeds to live longer. It is understood that climatic conditions after production may affect the moisture content and appropriate packaging may be required to prevent this while the growing medium is in storage or transit.

The bulking agent that is used in the growing medium is also a low-compressed bulking agent being compressed at a volume-to-volume ratio of not more than about 3:1. By using a low-compressed bulking agent the speed of rehydration and expansion of the growing medium is increased, and the expanded volume of the growing medium is usually equal to or greater than its volume before it is dehydrated and compressed. The combination of a dehydrated, non-compressed bulking agent also maintains the growing medium substantially free from all insects, diseases and weeds.

The grind size of the bulking agent helps to control the structural integrity of the growing medium even when wet. Generally, the grind size of the bulking agent depends on various factors of the growing medium, such as its size in compressed form, the size and type of any seeds included in the growing medium, and the amount of water drainage needed. Thus, the grind size is influenced by the location of use of the growing medium since the atmospheric conditions of locations vary from arid to humid, and since different climate zones support different types of seeds. Generally, the bulking agent grind size range from being able to pass through an approximately 1/8 inch mesh screen to being able to pass through an approximately 1 inch mesh screen.

The bulking agent may also include any added natural porous substrate that enhances the bulking agent, such as by adding beneficial nutrients or improving water drainage. Examples of suitable natural porous substrates include, but are not limited to, pine bark, fir bark, redwood bark, hardwood bark, polystyrene foam, sawdust, rock wool, perlite, vermiculite, scoria, composted organic materials, shale rock, calcined clay pellets and volcanic pumice. These porous substrates enhance the rate of water percolation or drainage pulled by gravity and the quantity of water stored after drainage.

The growing medium also includes one or more water-retentive polymers. These polymers, also called superabsorbing polymers (SAP's), are hydrophobic materials that can absorb fluid and retain it under pressure without dissolution in the fluid being absorbed. The materials used are generally all synthesized by one of two routes. In the first, a water soluble polymer is cross-linked so that it can swell between cross-links but not dissolve. In the second, a water-soluble monomer is co-polymerized with a water-insoluble monomer into blocks. Generally, the water-retentive polymer is a non-foamed polymer. Suitable water-retentive polymers include, but are not limited to, saponified starch graft polyacrylonitrile copolymers, polyacrylic acid, polymalsia anhydride-vinyl monomer superabsorbents, starch-polyacrylic acid grafts, polyacrylonitrile based polymers, cross-linked polyacrylamide, cross-linked sulfonated polystyrene, cross-linked n-vinyl pyrrolidone or vinyl pyrrolidone-acrylamide copolymer, and polyvinyl alcohol superabsorbents. These polymers absorb many times their own weight in aqueous fluid. Additional suitable water-retentive polymers include, but are not limited to sodium propionate-acrylamide, poly (vinyl pyridine), polyethylene imine, polyphosphates, poly (ethylene oxide), vinyl alcohol copolymer with acrylamide, and vinyl alcohol copolymer with acrylic acid acrylate.

In one exemplary embodiment the water-retentive polymer is a potassium- or sodium-based polymer, such as a synthetic polyacrylate/polyacrylamide copolymer. Like many absorbent polymers, it can absorb many hundred times its weight in water. In an embodiment, the absorbent polymer is acrylamide/potassium acrylate copolymer. Potassium-based polymers are non-toxic and do not cause harm to the environment. Additionally, potassium is a nutrient that promotes plant development. Generally, the water-retentive polymer used ranges up to about 25% by dry weight of potassium acrylate acrylamide copolymer, more preferably in an amount from about 2% to about 15% by dry weight of the growing medium.

The growing medium may also include a non-ionic surfactant or emulsifier that wets the dry hydrophilic bulking agent and decreases surface tension that would otherwise prevent water take up. Thus, the surfactant increases the rate at which the bulking agent absorbs water. Suitable surfactants include, but are not limited to polyoxypropylene-polyoxyethylene block co-polymers; alkanol amides, betamol derivatives; block co-polymers comprising a series of condensates of ethylene oxide with hydrophobic bases formed by condensing propylene oxide with proylene glycol; ethyoxylated compounds comprising alcohols, alkyl phenols, amines and amides, alkylphenol ethoxylates, fatty alcohol polyglycol ethers, oxo-alcohol polyethylene glycol ethers, alkylphenol-ethoxylates, fatty or oxo-alcohol polyethylene glyco ethers, and hydrophilic and hydrophobic block copolymers. In one embodiment the non-ionic surfactant is polyoxypropylene-polyoxyethylene block copolymer in an amount from about 0.001% to about 3.5% by dry weight of the total matrix.

The growing medium is also free of a water soluble binder material. Conventional growing media having a water-retentive polymer also contain a water soluble binder material, such as polyvinyl alcohol (PVA), polyvinyl acetate or a polyacrylate, to bind a growing medium together when wet and help to maintain the structural integrity of the growing medium. However, the compressed growing medium described herein does not require a binder material to maintain its structural integrity, and thus contains no PVA or other water soluble binder material.

The growing medium may also contain various other components. In one embodiment, the compressed growing medium includes seeds, thereby forming a pre-seeded compressed growing medium. The pre-seeded, compressed growing medium protects seeds against injury and enhances the conditions for germination and growth of seeds and plants. When wetted, the growing medium yields a gel that can bond to a growing surface, such as ground soil, localizing the seedling to grow at that point.

A pre-seeded, compressed growing medium typically uses a water retentive polymer that has a water absorbtivity from about 50 to about 600 times its weight. At such absorption levels, the entire composition upon exposure to rainfall or watering is converted to a wet, gas-permeable gel that protects and bonds the seed to the ground during germination.

The compressed growing medium may also contain other components, such as fertilizers, nutrients, pesticides, insecticides, fungicides, plant growth enhancers, or other beneficial components known to those of skill in the art.

Figure 1:
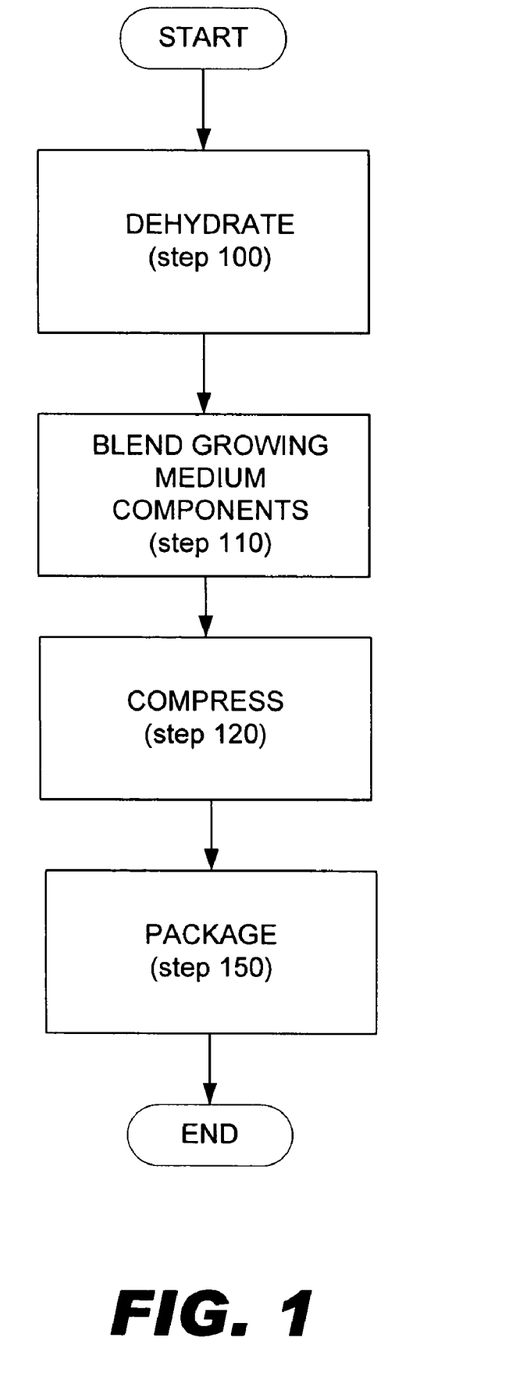
FIG. 1 is a flow diagram depicting an exemplary embodiment of a method of making a compressed soil mixture.

FIG. 1 depicts an exemplary method of making a compressed growing medium, both pre-seeded and non-seeded. The coir and/or other bulking agents are first dehydrated to about 25% moisture content in an air circulating oven set to approximately 95° C. (step 100). Preferably, the bulking agent is dehydrated to 15% or less humidity, and more preferably to about 11% or less humidity. If necessary, the bulking agent is also decompressed to a volume-to-volume ratio of about 3:1 or less. The growing medium components, including the bulking agent, the water-retentive polymer, the non-ionic surfactant, and any other additional components, are then blended together with a roller drum (step 110).

The growing medium, whether pre-seeded or non-seeded, is then compressed at a volume-to-volume ratio ranging from about 7:1 to about 10:1 in order to provide a compressed growing medium suitable for packaging, shipment and sale (step 120). The growing medium is typically compressed into bricks, slabs, wafers, pellets and any other shape. If the compressed growing medium includes seeds, its size and shape may be determined by the size of the included seeds and what is necessary to protect those seeds during compression. The terms "wafer" and "pellet" as used herein are not limited to any one shape, but may include shapes that are spherical, elliptical, egg-shaped, square, rectangular, crescent, convex, concave, flat or any other regular or irregular shape. The compressed bricks, slabs, wafers and pellets may then be packaged in pouches, grow-bags, cans, canisters, jars, boxes, and other packages known to those of skill in the art (step 150).

Figure 2A:
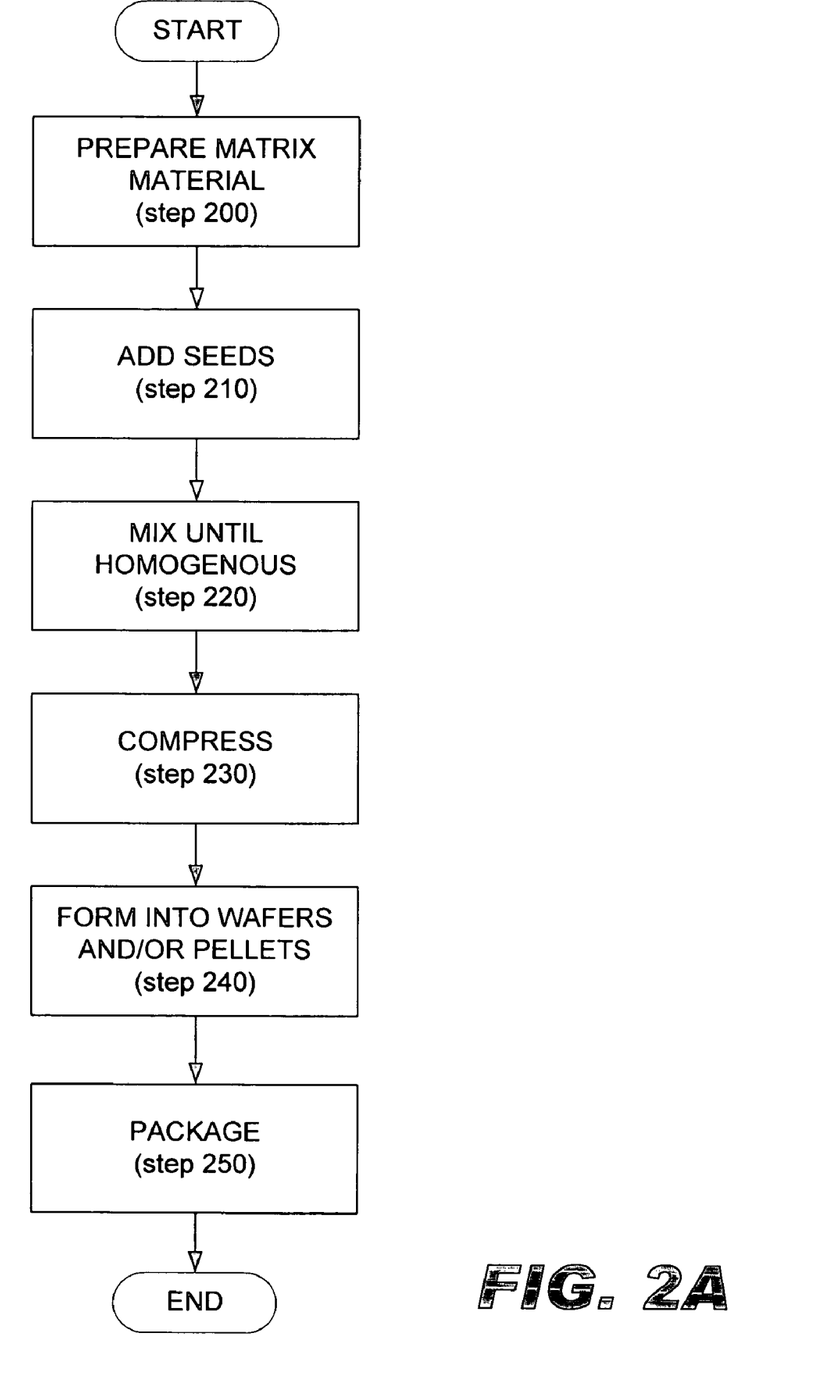
FIG. 2a is a flow diagram depicting another exemplary embodiment of a method of making a compressed soil mixture.
Figure 2B:
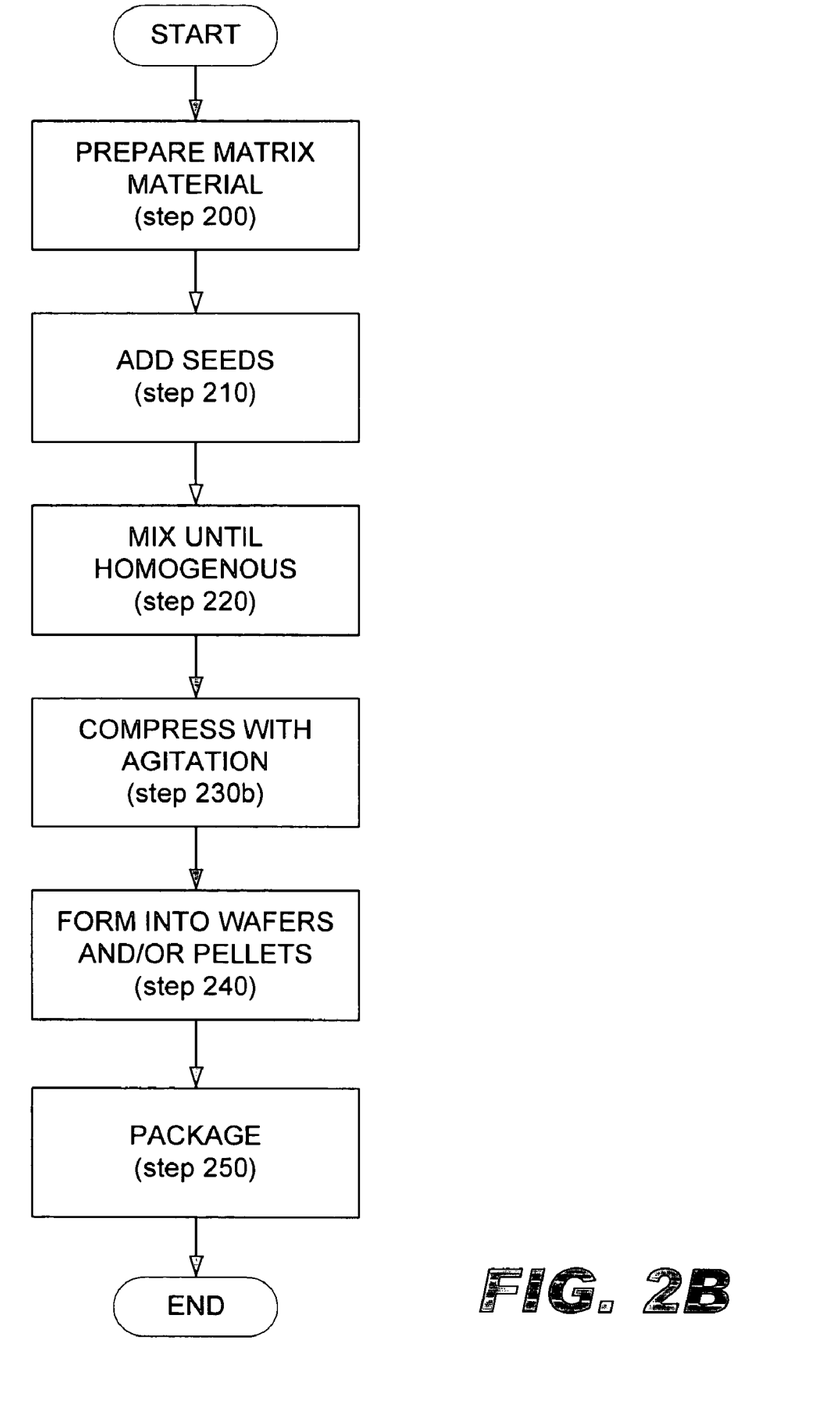
FIG. 2b is a flow diagram depicting another exemplary embodiment of a method of making a compressed soil mixture.
Figure 3:
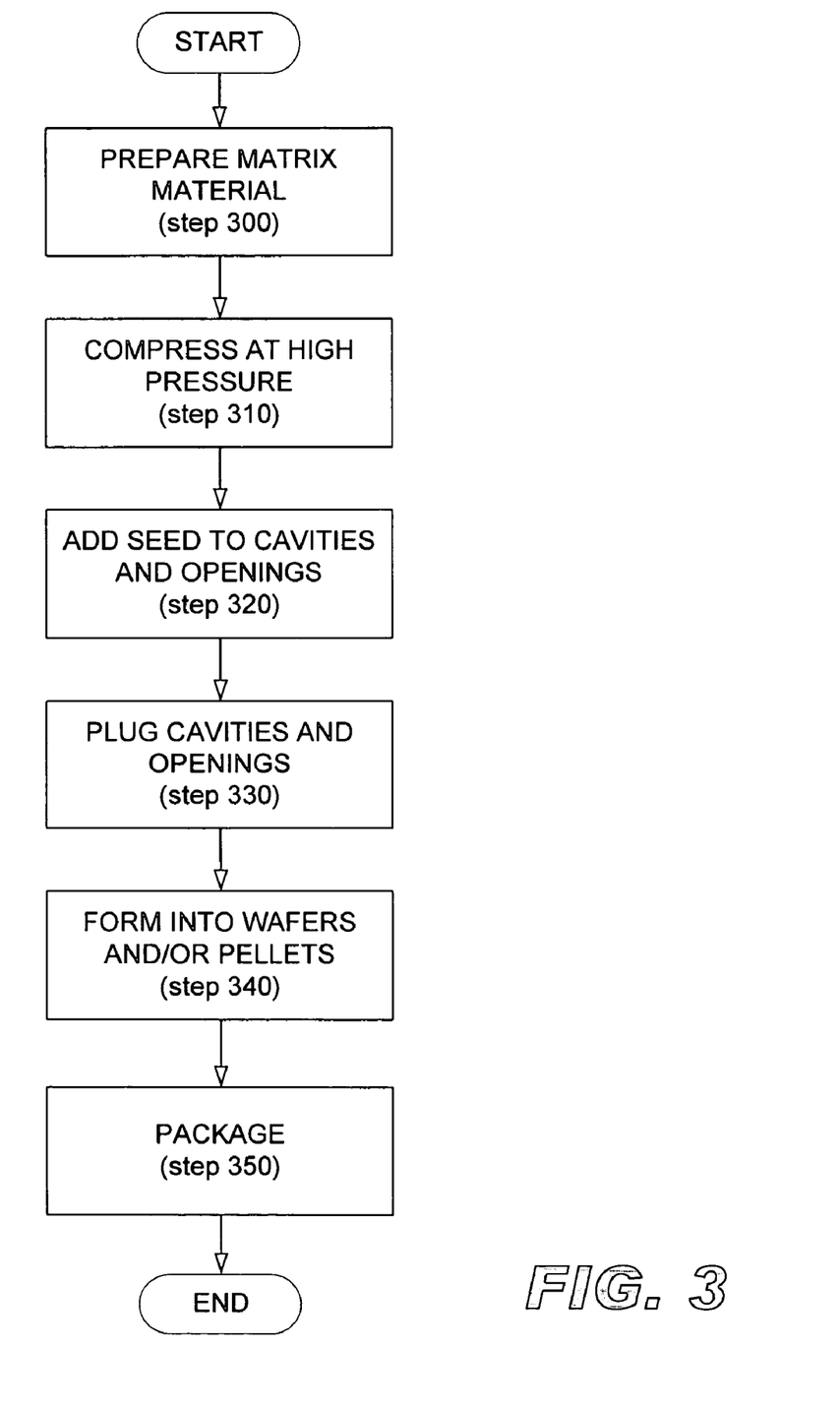
FIG. 3 is a flow diagram depicting another exemplary embodiment of a method of making a compressed soil mixture.
Figure 4:
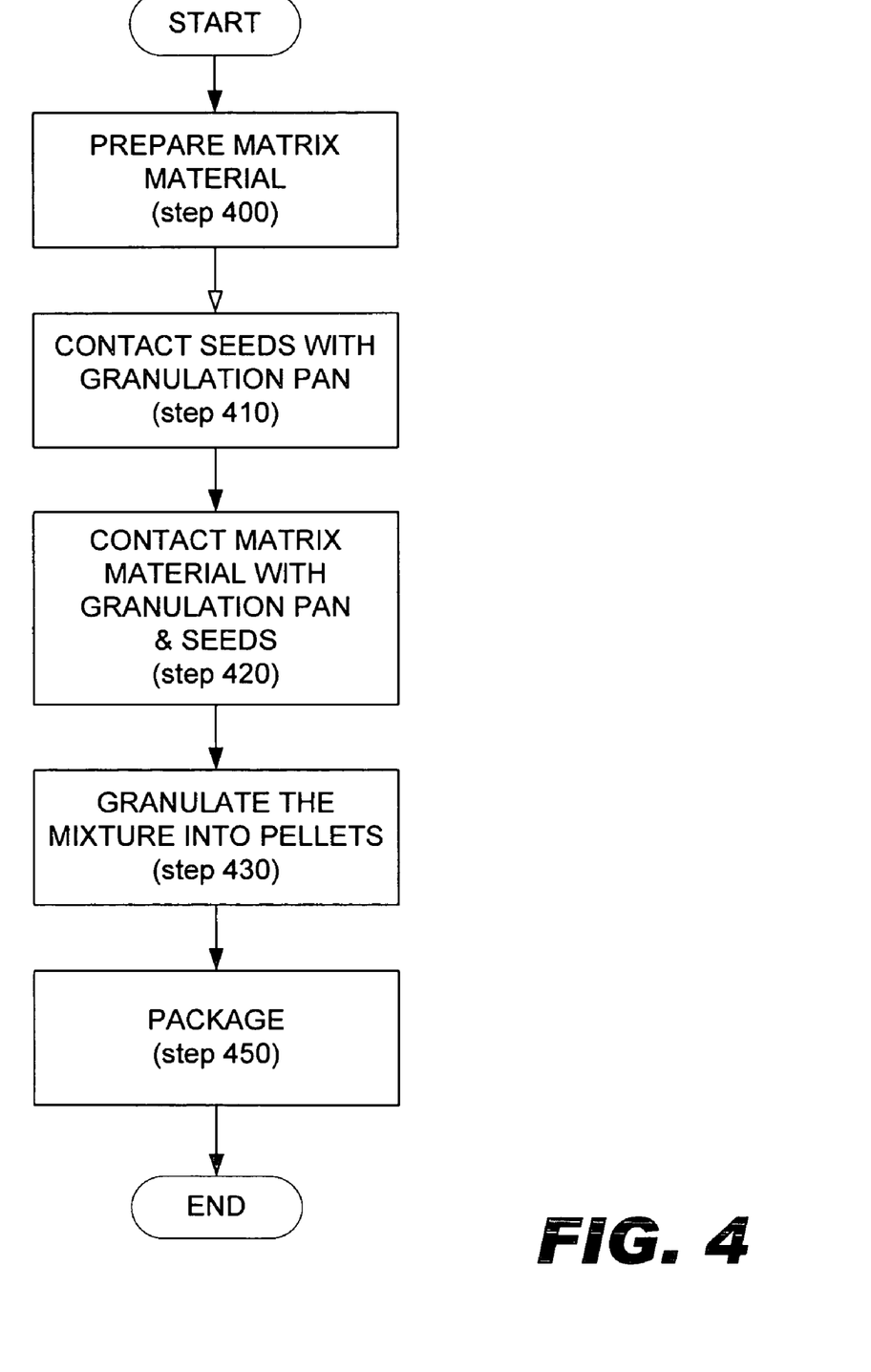
FIG. 4 is a flow diagram depicting another exemplary embodiment of a method of making a compressed soil mixture.

FIGS. 2-4 depict various embodiments of methods of making pre-seeded, compressed growing medium wafers and pellets. In one embodiment, as shown in FIG. 2, pre-seeded, compressed wafers and pellets are made by first blending together the growing medium components (step 200) in the manner described above. Seeds are then added to this medium (step 210), which is then blended together by means of a mixing apparatus so as to produce a homogenous, or substantially homogenous, pre-seeded growing medium (step 220). The seeded mixture is then compressed at about room temperature to form a pre-seeded, compressed growing medium (step 230). The compression can be carried out by means of a pressing device, such as a compactor or two form cylinders rotating in opposite directions. If the growing medium is compressed while containing the seed, a lower pressure may be used to prevent injury to the seed. In one embodiment, shown in FIG. 2b, the growing medium is compressed with concurrent agitation in order to thoroughly mix all components of the growing medium and prevent settling of heavier components, such as the water-retentive polymers, fertilizers and seeds (step 230b). The pre-seeded, compressed growing medium may then be molded, shaped or formed into wafers and/or pellets (step 240). The wafers and/or pellets are then packaged to reduce germination (step 250), as will be described in further detail below.

In another embodiment, as shown in FIG. 3, a pre-seeded, compressed growing medium wafer is made by first preparing a growing medium from the above-described components (step 300). This growing medium is then pressed at high pressures (approximately 7500 psi) (step 310) before the seed is added to the growing medium (step 320). The size of the cavity to hold the seed is determined by the size of the particular seed type used. Once the seed is placed in the cavity, the cavity opening is plugged (step 330) with a suitable material that will remain in place once dried and that is not toxic to the seed or germinating plant. In one embodiment the growing medium cavities are plugged with a paste composed of 50% by dry weight dry peat and 50% by dry weight of an aqueous solution containing 11.25% by dry weight PVA (Elvanol™ 7130, E.I. du Pont de Nemours and Company) and 0.125% by dry weight non-ionic surfactant (Pluronic L-92, BASF). Other material may be used to plug the cavity including silicate clays. The compressed growing medium is then formed into wafers and pellets (step 340) and then packaged for sale (step 350).

In any method used, since heat may be released during the pressing process it may be necessary to design the pressing device and to carry out the pressing process in a manner to keep the temperature of the different constituents of the wafers or pellets, and in particular the temperature of the grains of seed contained therein, from exceeding 35° C., and preferably from exceeding 30° C., so that the germinating ability of the grains of seed will not be negatively affected. After the wafers or pellets have been pressed, or possibly while they are being pressed, they may be cooled down again to normal room temperature of about 20° C. to 25° C., such as by passing an air stream through them or by exposing them to ambient temperature.

In another embodiment, shown in FIG. 4, compressed seed pellets are formed by first preparing a growing medium (step 400). A source of agronomic seeds is then contacted with a granulation pan (step 410). The growing medium is then contacted with the granulation pan (step 420) and the mixture is granulated (step 430) in the granulation pan to form pellets of encapsulated agronomic seeds. The compressed seed pellets may then be packaged (step 450), as described below.

Other methods for forming compressed pellets include spraying seeds while rotating in a mixer, the use of drum coaters, fluidized bed techniques, Wurster air suspension coating processes, pan coaters and spouted beds. In each of these methods the seeds may be pre-sized prior to coating.

Figure 5:
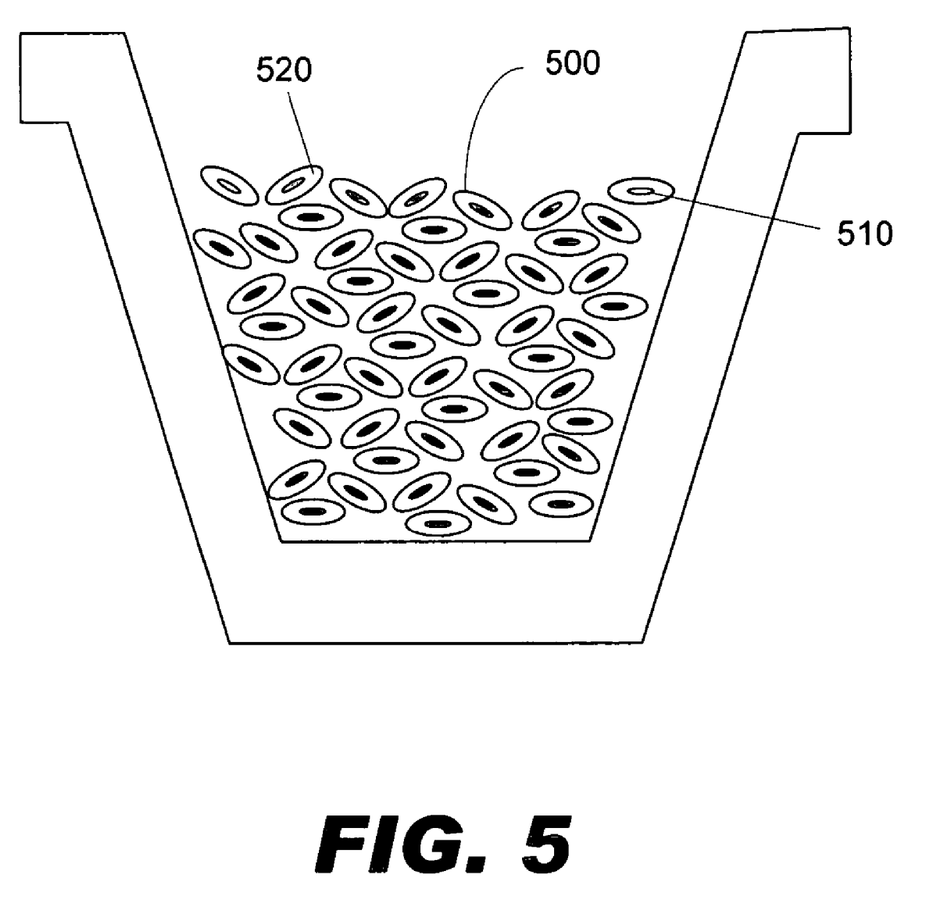
FIG. 5 depicts one exemplary embodiment of a compressed soil pellet mixture.
Figure 6:
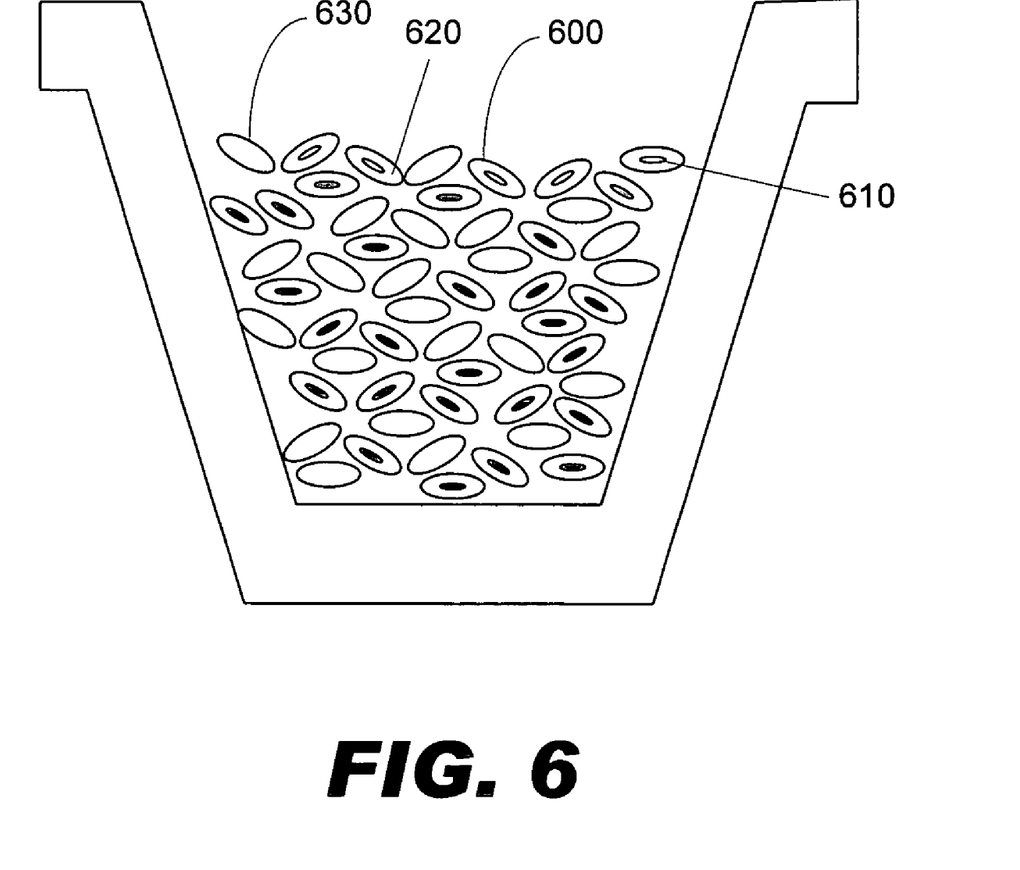
FIG. 6 depicts another exemplary embodiment of a compressed soil pellet mixture.
Figure 7:
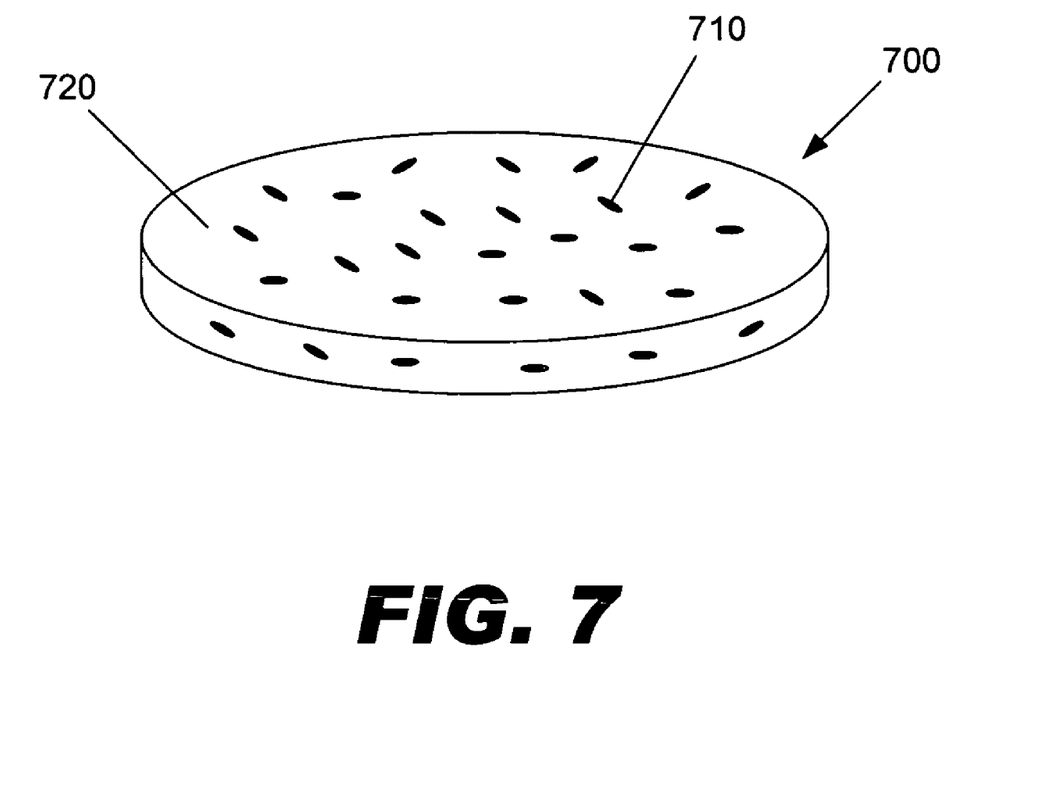
FIG. 7 depicts an exemplary embodiment of a compressed soil wafer.

As shown in FIGS. 5-7, the pre-seeded compressed growing medium wafers (700) and pellets (500, 600) generally contain seeds (510, 610, 710) uniformly dispersed throughout the soil mixture (520, 620, 720). The seeds used in the growing medium (510, 610, 710) may include, but are not limited to, seeds for vegetables, flowers, trees, grasses, herbs, grains, crops, and other plants. The wafers (700) and pellets (500, 600) each contain at least one grain of seed, but may contain, depending on the type and size of the grains of seed, at least 2, preferably at least 4 or up to not more than 15 grains of seed. The grains of seed (510, 610, 710) are generally distributed uniformly over the entire volume of the wafers or pellets. In one embodiment the wafers (700) and pellets (500, 600) contain a variety or mixture of any of the above seeds. In one embodiment, shown in FIG. 4, the growing medium includes compressed pellets (500) in which each pellet (500) includes a seed (510), such as grass seeds, encapsulated in the growing medium (520). This embodiment is particularly useful in creating large, grassy areas such as in sports arenas, parks and playing fields. In a further embodiment, shown in FIG. 6, some of the compressed pellets (600) include seeds (610) encapsulated in the growing medium (620) while other pellets (630) contain a growing medium (620), but have no seeds.

As illustrated in the exemplary methods mentioned above, the pre-seeded, compressed growing medium wafers and pellets can be packaged to minimize and reduce germination of the seeds during storage and transport. (steps 150, 250, 350, 450) Since many factors contribute to seed germination, such as seed viability, ambient moisture, proper temperature, ample oxygen, and light, many methods are available to alter these factors to reduce seed germination during storage and transport. Maintaining humidity and/or oxygen levels at the lowest possible levels in the packaging is an efficient way of reducing premature seed germination. Suitable methods for producing a dehydrated packaging include vacuum-packing, pillow packing, controlled atmosphere packing, modified atmosphere packing, desiccant packing, and other methods known to those of skill in the art.

In one embodiment the pre-seeded, compressed growing medium wafers and pellets are vacuum-packed. Vacuum packing is a process whereby air and/or the water in it are evacuated from a storage bag or container, thus decreasing the oxygen content and humidity in and around the soil mixture. Generally, the vacuum-packing process may be carried out by any process or apparatus known to those of skill in the art. Conventional vacuum-sealing or vacuum-packing machinery may be used, such as external clamp pouch machines, external clamp snorkel machines (also known as retractable nozzle machines) and chamber machines.

In other embodiment the wafers and pellets are packaged by pillow packing, controlled atmosphere packing or modified atmosphere packing. In these methods, after the growing medium is vacuum-packaged a gas or combination of gases is injected into the package to yield a package that has substantially all atmospheric oxygen removed but is not drawn tight around the growing medium. Suitable gases include, but are not limited to nitrogen, carbon monoxide, carbon dioxide, sulfur dioxide, and inert gases such as helium, argon, xenon and neon. The added gas or gases reduces the pressure generated by the package on the growing medium and seeds. These anoxic packages contain little to no oxygen, thus greatly inhibiting seed germination while permitting a higher moisture content to help maintain the integrity of the growing medium structure. In another embodiment, the compressed growing medium is vacuum freeze dried before packing.

In yet another embodiment, the growing medium is packaged with a desiccant to reduce the ambient humidity. Suitable desiccants include, but are not limited to, silica gel, clays, calcium oxide, calcium sulfate, calcium chloride, molecular sieves, charcoal, alumina, alumino silicate, calcium fluoride, lithium chloride, starches, a zeolite, barium oxide, magnesium perchlorate, glycerin, calcium hydride, phosphoric anhydride, phosphoric acid, potassium hydroxide, sulfuric acid, ethylene glycol, barium oxide, sodium sulfate and combinations thereof. In another embodiment, inert gas may also be introduced into the package to replace air and/or moisture. Including a desiccant or inert gas significantly reduces humidity, thus greatly reducing seed germination.

The packages used for packaging the growing medium according to the above methods include, but are not limited to jars, cans, plastic pouches, standard flat vacuum pouches, and other packages known to those of skill in the art. In one embodiment the package comprises vacuum pouches made of multi-layered nylon and polyethylene. In another embodiment the package comprises plastic cans such as tennis ball cans. Since the vacuum-packing and other methods of packing described above are used to produce substantially dehydrated and anoxic packages for reduced seed germination, other methods of packing known to those of skill in the art that do not reduce humidity or oxygen content can be used for a compressed growing medium that is not pre-seeded.

Figure 8:
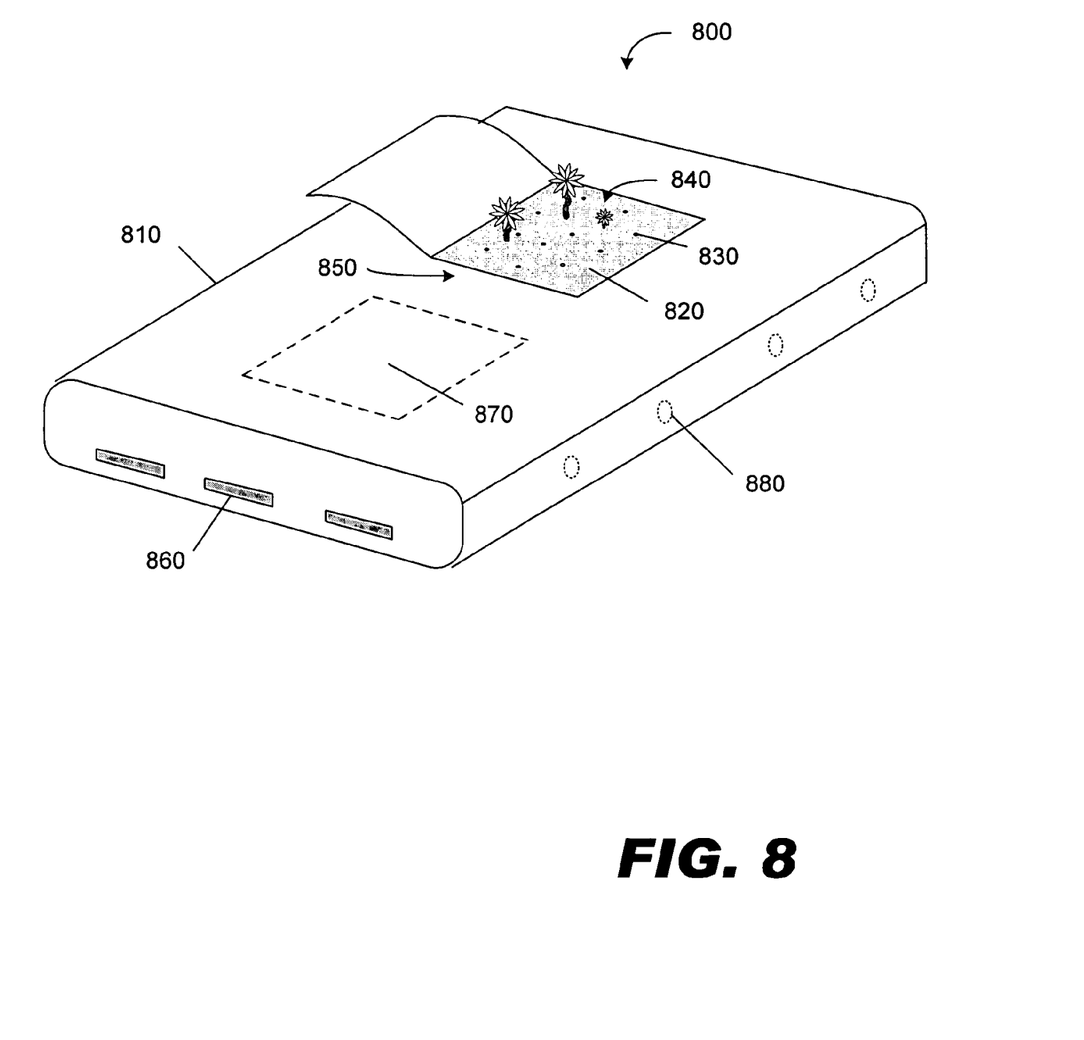
FIG. 8 depicts an exemplary embodiment of a grow bag.

In another embodiment, shown in FIG. 8, the compressed growing medium is packaged in a grow bag (800). The grow bag (800) generally includes a sealed plastic bag (810) that contains a compressed growing medium (820) inside. The compressed growing medium (820) can also contain seeds (830) if it is a pre-seeded growing medium. The pre-seeded growing medium allows a user to just add water to begin the germination process. The plastic bag (810) is usually made from a breathable plastic, such as co-extruded polyethylene, polypropylene. The plastic used may also be configured to be rot-resistant, UV resistant, and/or weather resistant. The grow bag (800) obviates the need for a planter or pot because plants (840) can be planted in the grow bag (800) by cutting a hole (850) in the plastic bag (810) and planting in the exposed growing medium (820). Grow bags of this type are commonly used in horticulture and hydrophonic green house industries for growing strawberries, tomatoes, peppers, cucumbers, and are also used in the floriculture industry for roses, gerbera and many more highly demanded seasonal and non-seasonal flowers.

The grow bag provides many benefits over traditional grow bags or growing media. Since the growing medium (820) used in the grow bag (800) contains a water-retentive polymer, the need for drainage holes can be eliminated since the polymer retains most of the moisture. The grow bags (800) also are easy to transport and take up little space since the growing medium (820) is compressed. When wetted, the growing medium expands and provides an enhanced growing environment for plants. Plants (840) grown in the grow bag (800) quickly develop more elaborate and stronger root systems and have significantly reduced root diseases (recent studies strongly suggest coir inhibits Pithium and Phytothora growth). The grow bags (800) are also recyclable and easy to handle or dispose.

The grow bag (800) may be fluted with pre-punched drain holes (860). The grow bag may also contain perforated sections (870) that can be manually torn and removed to expose the growing medium (820) for planting or to expose the growing medium (820) to improve aeration and access to sunlight and to remove the plastic bag (810) as a barrier to plant and seedling growth. Other drainage perforated sections (880) can be removed to provide water drainage holes.

Generally, the compressed growing medium, whether in bricks, slabs, wafers and pellets, can be used anywhere a conventional soil or growing medium is used, including sports fields, parks, home lawns, gardens, indoor pots, outdoor pots, greenhouses, nurseries, farms, forests, and other agricultural, forest, commercial and home uses. By compressing the growing medium and packaging it to reduce germination, the seeds in the soil mixture live longer, thereby producing a higher quality product when it is deposited for its intended use.

The wafers and pellets can be deposited according to any method known to those of skill in the art, such as by hand or with machinery. After depositing the wafers and pellets, water is added to the soil mixture. When the soil mixture is wetted it becomes gel-like, expands, and bonds to the soil localizing the seedling's growth at the point the seed capsule is deposited. Approximately one inch of rain is required to activate the preferred capsule matrix; however, water requirements can be varied in light of local climate conditions, seed requirements, and resulting proportions of matrix components. The resulting gel-like structure permits the exchange of oxygen and the retention of water that are essential for the germination of the seeds. It also forms a mechanical barrier to predators. In addition, the encapsulating process permits the optional inclusion of nutrients, fertilizers and fungicides selected to address local conditions. In other embodiments the soil mixture includes commercial fungicides such as Banlate™ at levels to 5000 ppm, Ridamil™ at levels to 50 ppm, and Thiaram™ at levels up to 25 ppm without toxic effect to the seeds.

Precise ratios of ingredients affect the most advantageous characteristics of the growing medium. The particular use made of the growing medium and local growing conditions will dictate the ratios chosen. Generally the growing medium, when wetted, holds sufficient water to supply the needs of the germinating seeds, bedding plant, or house plant, but not hold so much to subject the seed or plant to a deleterious amount of water. The combination of component characteristics in the growing medium yields a product that has qualities of performance, convenience and cost-effectiveness.

ALTERNATIVE EMBODIMENT

According to one alternative exemplary embodiment, the wafers or compressed growing medium in another form are reground in order to reduce the overall size of the growing medium in its compressed form. Traditionally, compressed growing medium that is distorted or broken is re-introduced into the mixture of materials to be re-processed. However, re-introduced compressed growing medium can only be added to virgin material so long as the ratio of re-introduced material to virgin material does not exceed approximately 10:1. Specifically, when more than approximately 10% of the material used in the above-mentioned methods is re-introduced material, compression of the mixture provides overly dense hard wafers as well as causing undue stress on the press. Consequently, mixtures of materials having reground content in excess of approximately 10 percent have traditionally been discarded.

Figure 9:
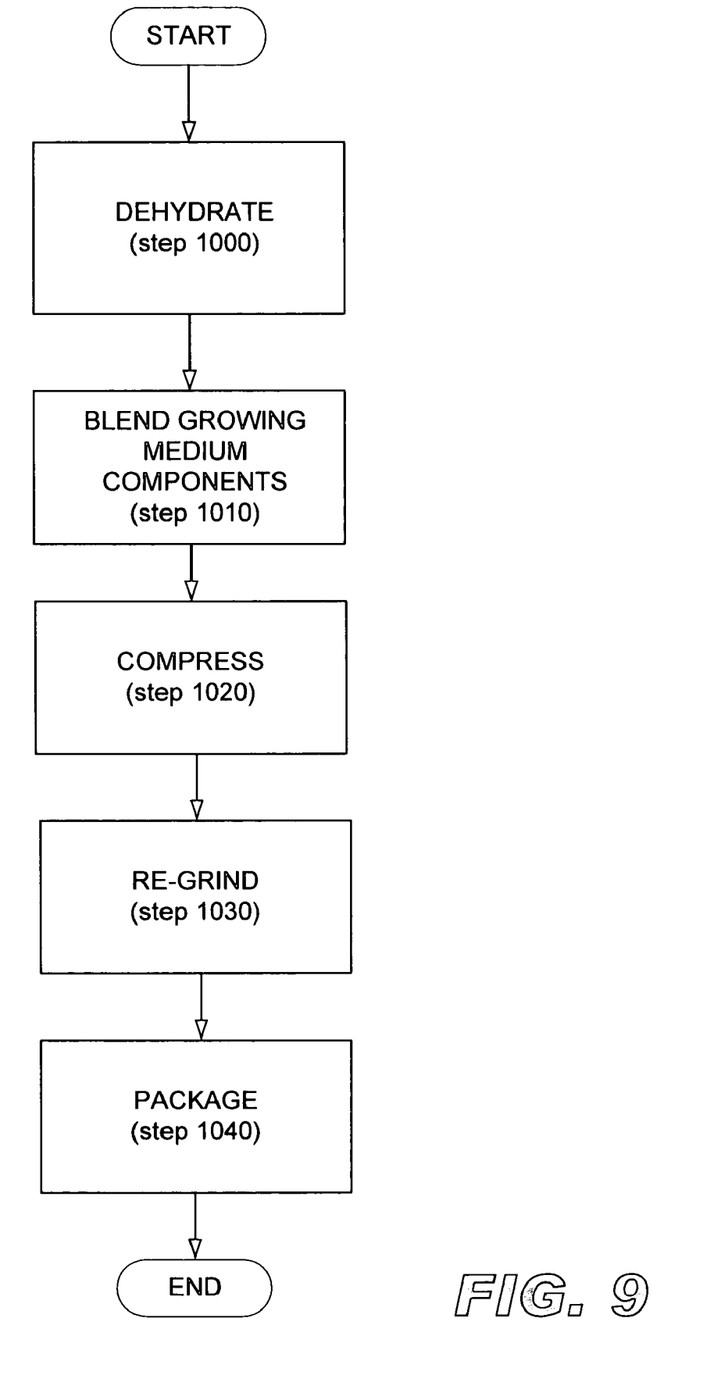
FIG. 9 illustrates a regrinding method, according to one exemplary embodiment.

According to the present exemplary embodiment, compressed growing medium is reground after compression and used as an expanding soil mixture. FIG. 9 illustrates an exemplary method for forming the reground expanding soil material, according to one exemplary embodiment. As shown in FIG. 9, the present exemplary embodiment begins by first dehydrating the coir and/or other bulking agents to about 25% moisture content in an air circulating oven set to approximately 95° C. (step 1000). Preferably, the bulking agent is dehydrated to 15% or less humidity, and more preferably to about 11% or less humidity. If necessary, the bulking agent is also decompressed to a volume-to-volume ratio of about 3:1 or less. The growing medium components, including the bulking agent, the water-retentive polymer, the non-ionic surfactant, and any other additional components, are then blended together with a roller drum (step 1010).

The growing medium, whether pre-seeded or non-seeded, is then compressed at a volume-to-volume ratio ranging from about 7:1 to about 10:1 in order to form a base material for regrind (step 1020). The growing medium is typically compressed into bricks, slabs, wafers, pellets and any other shape. If the compressed growing medium includes seeds, its size and shape may be determined by the size of the included seeds and what is necessary to protect those seeds during compression. The terms "wafer" and "pellet" as used herein are not limited to any one shape, but may include shapes that are spherical, elliptical, egg-shaped, square, rectangular, crescent, convex, concave, flat or any other regular or irregular shape.

Figure 10:
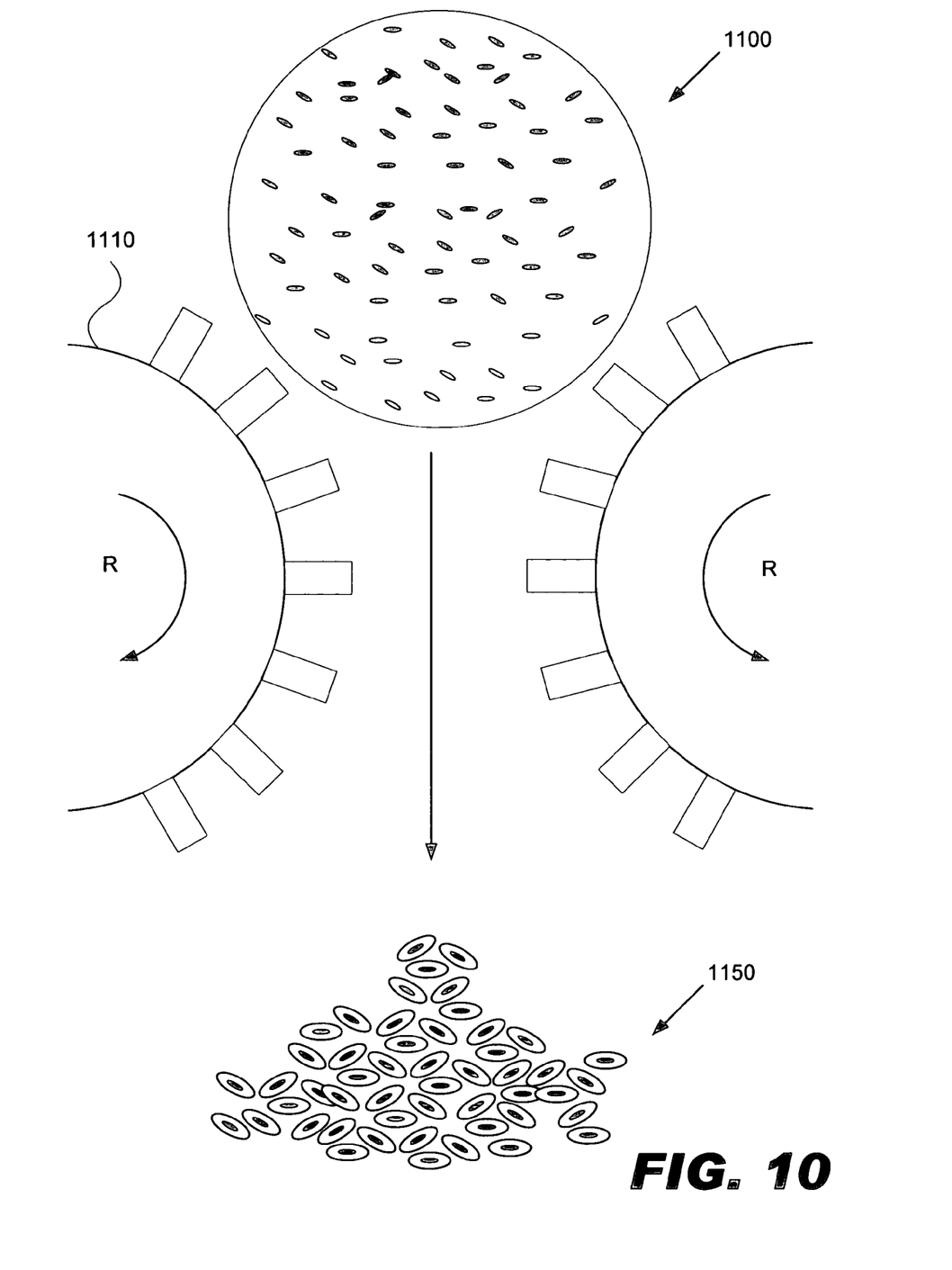
FIG. 10 illustrates a regrinding method, according to one exemplary embodiment.

Once the base compressed material is produced, the material may then be reground (step 930). FIG. 10 illustrates a grinding process according to one exemplary embodiment. As shown, the base material (1100) is fed into a hopper or other collection bin (not shown), where the base material is placed in contact with a grinding apparatus (1110). As shown, the grinding apparatus (1110) includes a plurality of rollers rotating in opposing directions, as indicated by the arrows (R). While the grinding apparatus (1110) of FIG. 10 is shown as having a plurality of rollers with grinding teeth, any number of rollers or grinders may be used to regrind the base material (1100) including, but in no way limited to, a shredder, a ball mill, a roller mill, and the like.

As illustrated in FIG. 10, once the base material (1100) is ground by the grinding apparatus (1110), the base material is broken down into any number of smaller reground components (1150). According to the present exemplary embodiment, the initial compression of the base material stabilizes the structure of the materials. Regrinding the already stable materials simply breaks the compressed material into smaller sections of compressed material. Consequently, the reground material provides the same expansion and soil making characteristics as the above-mentioned products.

Additionally, while the reground components (1150) illustrated in FIG. 10 are shown as having a substantially similar size, the reground components (1150) may be ground into a number of varying sizes in a single batch. According to this exemplary embodiment, the reground components (1150) are ground to be less than 0.4 inches in mean diameter. One effect of limiting the size of the reground components to a particle size of less than approximately 0.4 inches in mean diameter is that the flow of reground material and seeds or nutrients is more consistent. Specifically, by including reground components (1150) of varying sizes, each having a maximum particle size less than approximately 0.4 inches, a consistent matrix of components that interact with each other and prevent relative motion is less likely to occur. Rather, unbalanced interactions by the inconsistent surface areas of the varying reground components (1150) facilitate flow of the material from a container and provides for smooth deployment of the material to a desired location.

In addition, with the base material (1100) reground, any number of additives may be added including, but in no way limited to, nutrients, fertilizers, seeds, etc. According to the present exemplary embodiment, the varying size of the reground components (1150) facilitates even distribution of seeds or additives while preventing uneven distribution due to settling during storage. According to one exemplary embodiment described above, the varying sizes of the reground components (1150) facilitate flow of the particles. This added flow enables even distribution of seeds and/or additives during any number of mixture stages. Additionally, the varying sizes of the reground components (1150) allows for an irregular or non-lattice placement of particles. This irregular placement of particles tends to eliminate gaps that occur between similarly sized particles, thereby forming a relatively dense agglomeration of particles. Consequently, the present exemplary reground components (1150) having varying sizes less than 0.4 inches in mean diameter maintain an even distribution of seeds and/or additives during storage and transportation.

Returning to FIG. 9, once the reground material is produced and any additives or other material has been added, the reground material may be packaged (step 1040). According to the present exemplary embodiment, the smaller size of the reground material allows for increased flexibility in choosing a packaging container. Any number of packaging containers may be used with the reground components including, but in no way limited to pouches, grow-bags, cans, canisters, jars, boxes, and other packages known to those of skill in the art. Additionally, the reground components may be more easily distributed to desired locations.

While the present exemplary method details the use of a single method for forming the base material (1100), any of the methods disclosed herein for forming the compressed base material may be used.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A reground growing medium, comprising:
   a bulking agent, wherein a particle size of said reground growing medium is less than 0.4 inches in mean diameter; and
   wherein said growing medium is compressed at a volume-to-volume ratio from an initial ratio of less than 3:1 to a ratio ranging from 7:1 to about 10:1 and then reground without reducing said volume to volume ratio to form an expanding soil mixture.

2. The reground growing medium of claim 1, wherein said reground growing medium comprises a plurality of particles, wherein said particles have varying particle sizes, each particle size being less than 0.4 inches in mean diameter.

3. The reground growing medium of claim 1, wherein said reground growing medium further comprises a water-retentive polymer.

4. The reground growing medium of claim 3, wherein said growing medium is substantially free of water-soluble binder material.

5. The reground growing medium of claim 1, wherein said bulking agent comprises coir.

6. The reground growing medium of claim 3, wherein said water-retentive polymer is a non-foamed polymer.

7. The reground growing medium of claim 3, wherein said water-retentive polymer comprises an acrylic polymer.

8. The reground growing medium of claim 3, wherein said acrylic polymer comprises one of a polyacrylate/polyacrylamide copolymer or polyacrylamide.

9. The reground growing medium of claim 1, further comprising seeds.

10. The reground growing medium of claim 1, further comprising a fertilizer, nutrients, a pesticide, an insecticide, a fungicide, a plant growth enhancer or a combination thereof.

11. The reground growing medium of claim 1, wherein the growing medium is initially compressed into at least one wafer, pellet, brick or slab.

12. The reground growing medium of claim 1, wherein said reground growing medium is enclosed in a dehydrated package.

13. The reground growing medium of claim 12, wherein said dehydrated package is vacuum-packed.

14. The growing medium of claim 1, further comprising a non-ionic surfactant or emulsifier.

15. A method of making a growing medium to form an expanding soil mixture, comprising: compressing a dehydrated growing medium at a volume-to-volume ratio from an initial ration of less than 3:1 to a ratio ranging from 7:1 to about 10:1; and regrinding said compressed growing medium to a varying particle size of less than 0.4 inches in mean diameter.

16. The method of claim 15, further comprising packaging said reground compressed growing medium.

17. The method of claim 15, wherein said growing medium comprises coir.

18. The method of claim 15, wherein said dehydrated growing medium comprises less than 15% moisture content.

19. The method of claim 15, further comprising adding seeds to said reground growing medium.

20. The method of claim 15, further comprising adding seeds or a water retentive polymer to said dehydrated growing medium.

21. The method of claim 15, further comprising adding a non-ionic surfactant or emulsifier to said dehydrated growing medium.

22. The method of claim 15, further comprising adding a fertilizer, nutrients, a pesticide, an insecticide, a fungicide, a plant growth enhancer or a combination thereof to said dehydrated growing medium.

* * * * *